(12) United States Patent
Metz

(10) Patent No.: US 7,743,457 B2
(45) Date of Patent: Jun. 29, 2010

(54) WIPER DEVICE, ESPECIALLY FOR A MOTOR VEHICLE

(75) Inventor: Ulrich Metz, Achern (DE)

(73) Assignee: Robert Bosch GmbH, Stuttgart (DE)

( * ) Notice: Subject to any disclaimer, the term of this patent is extended or adjusted under 35 U.S.C. 154(b) by 1201 days.

(21) Appl. No.: 10/560,466

(22) PCT Filed: Apr. 15, 2004

(86) PCT No.: PCT/DE2004/000792

§ 371 (c)(1),
(2), (4) Date: Dec. 14, 2005

(87) PCT Pub. No.: WO2004/113135

PCT Pub. Date: Dec. 29, 2004

(65) Prior Publication Data

US 2006/0168754 A1    Aug. 3, 2006

(30) Foreign Application Priority Data

Jun. 18, 2003   (DE) .............................. 103 27 858

(51) Int. Cl.
*B60S 1/06* (2006.01)
*B60S 1/04* (2006.01)

(52) U.S. Cl. .............. 15/250.31; 15/250.3; 403/DIG. 3; 403/2; 403/348; 296/96.17

(58) Field of Classification Search ................ 15/250.3, 15/250.31; 296/96.15, 96.17; 403/24, DIG. 3, 403/2, 348

See application file for complete search history.

(56) References Cited

U.S. PATENT DOCUMENTS 3,606,406 A    9/1971  Walters

FOREIGN PATENT DOCUMENTS

| DE | 198 33 488 | 1/1999 |
|---|---|---|
| EP | 0 916 559 | 5/1999 |
| EP | 0 950 586 | 10/1999 |
| JP | 11124014 | 5/1999 |
| JP | 11217061 | 8/1999 |
| JP | 2002200969 | 7/2002 |
| WO | 03/047926 A1 | 6/2003 |
| WO | WO 03/051690 | 6/2003 |

*Primary Examiner*—Gary K Graham
(74) *Attorney, Agent, or Firm*—Michael Best & Friedrich LLP

(57) ABSTRACT

A windshield wiper device, in particular for a motor vehicle, comprising a carrier (12) for fixing to a first part (52), especially to the body of the motor vehicle. A locking element (40) having a predetermined breaking point (41) is also provided in order to enable the carrier (12) to be fixed to the first part (52) by a rotational connection.

17 Claims, 5 Drawing Sheets

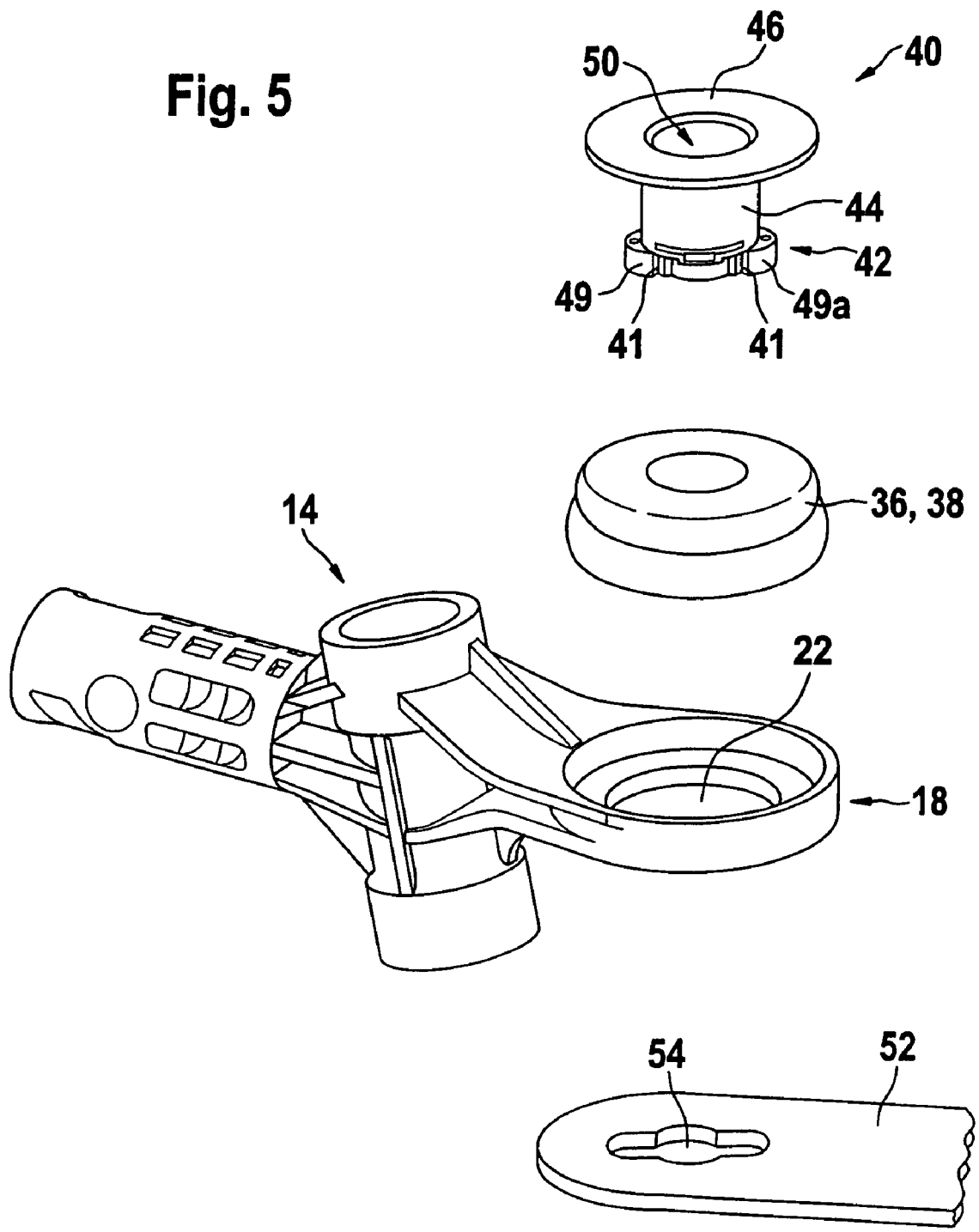

WIPER DEVICE, ESPECIALLY FOR A MOTOR VEHICLE

BACKGROUND OF THE INVENTION

The invention relates to a windshield wiper device, in particular for a motor vehicle.

Numerous windshield wiper devices featuring a carrier, which is fixed to a first part, for example the body of a motor vehicle, are already known. Normally, the carrier has openings through which screws or rivets can be drawn so that the windshield wiper device can be screwed down to the body with the aid of several screws and various damping elements. This is relatively expensive and cost-intensive since bore holes provided with threads have to be attached to the body of the motor vehicle or holes have to be provided onto which a screw nut has to be welded.

In addition, the windshield wiper device is very solidly connected with the body of the vehicle and this means that a pedestrian can be easily injured in an impact with the engine hood of the motor vehicle by the wiper shafts projecting from the body, which bear the wiper arms and wiper blades.

SUMMARY OF THE INVENTION

The windshield wiper device in accordance with the invention has the advantage that the windshield wiper device can be fixed in the simplest manner to the body of the motor vehicle by a rotational connection with a locking element. A rotational connection does not require any threads and can be closed by a rotation less than 360 degrees. As a result, the number of work steps before and during assembly can be reduced and the costs during manufacturing and assembly are reduced. In addition, a predetermined breaking point in the locking element allows simple and cost-effective pedestrian impact protection to be realized.

It is especially advantageous if the rotational connection features a catch, which serves as an orientation for the locking element and locks said locking element into a preferred position. The connection strength is increased in this way so that the connection will not detach by itself even in the case of strong, longer lasting vibrations like those that constantly occur when operating a vehicle. However, because of the predetermined breaking point, detachment of the connection in the case of a pedestrian impact on the wiper shafts of the windshield wiper device is guaranteed in spite of this.

The rotational connection is realized in an especially simple manner in that the carrier has an opening and the locking element in a closed state penetrates the opening.

To improve the damping and avoid acoustic bridges it is advantageous if an elastic damping bushing is arranged between the locking element and opening.

If the locking element features a first section, which is longer in cross section than it is wide, the windshield wiper device is stably fixed to the vehicle body and a predetermined breaking point can be provided in a simple way.

This can be realized in an especially simple manner by an elliptical cross section.

Because of a transverse groove to accommodate the first part, brackets are created on the first section of the locking element and these brackets further increase connection strength. In this case, it is of particular advantage if the width of the transverse groove is greater than the thickness of the first part.

It is especially advantageous if the first part is embodied as a stamped part or stamped bent part, which features a hole having the shape of the first section of the locking element.

In this connection, it is especially advantageous if the locking element penetrates the first part and the first part features a slant of such a type that the locking element is pulled into the first part during the closing process. In this way, the connection strength is increased and a thread-like effect is achieved without the thread having to be cut into the body of the motor vehicle. If a damping bushing is arranged between the locking element and the opening of the carrier, said carrier is pretensioned by the slant of the first part, thereby further improving damping.

It is advantageous if the locking element has an engagement, which enables it to cooperate with a tool.

BRIEF DESCRIPTION OF THE DRAWINGS

One exemplary embodiment of the invention is depicted in the drawings and explained in greater detail in the following description. The drawings show.

DETAILED DESCRIPTION

Figure 1:
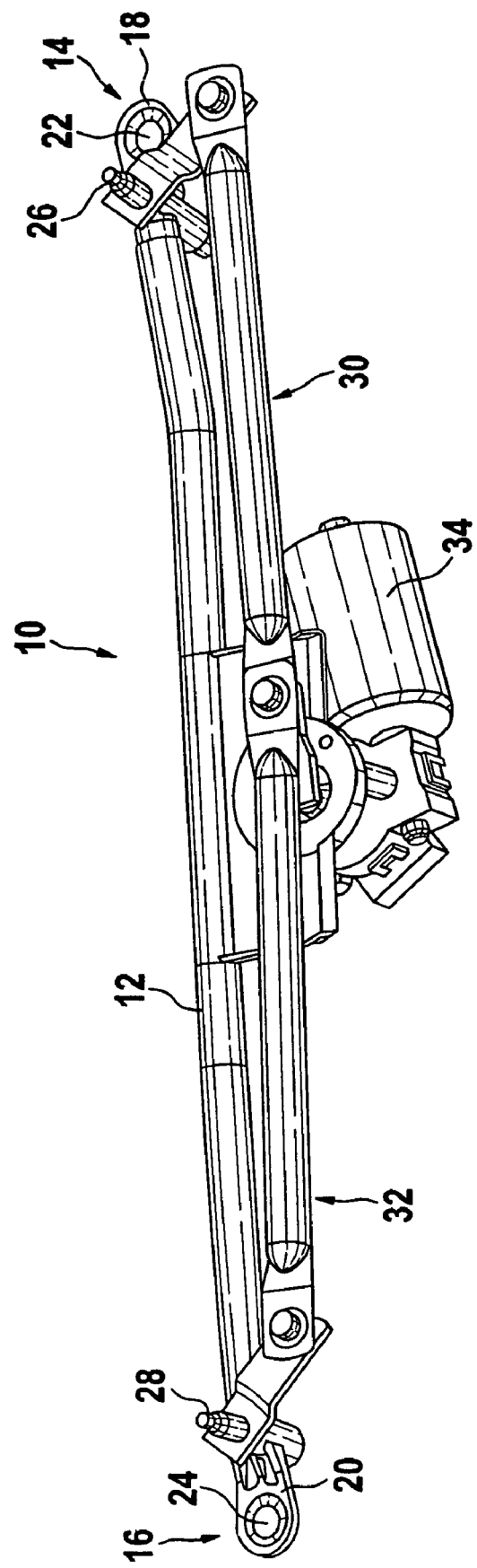
FIG. 1 A schematic representation of a windshield wiper device in accordance with the invention FIG. 2 An exploded representation of a wiper bearing, a windshield wiper device in accordance with the invention with the fixing area FIG. 3 The connection area in the delivery state at the motor vehicle manufacturer FIG. 4 The fixing area of a windshield wiper device in an assembled position FIG. 5 A variation of the wiper bearing of the windshield wiper device from FIG. 2.

FIG. 1 shows a schematic depiction of a windshield wiper device 10 in accordance with the invention. It essentially includes a carrier 12 consisting of a tube with a wiper bearing 14, 16 arranged on each of its ends. Each wiper bearing 14, 16 features ears 18, 20 and each of these ears has an opening 22, 24. Furthermore, wiper shafts 26, 28, which are connected to wiper arms (not shown in this case), are positioned in the wiper bearings 14, 16. The wiper shafts 26, 28 are driven via a crank mechanism 30, 32, which is put into motion by a motor 34.

Figure 2:
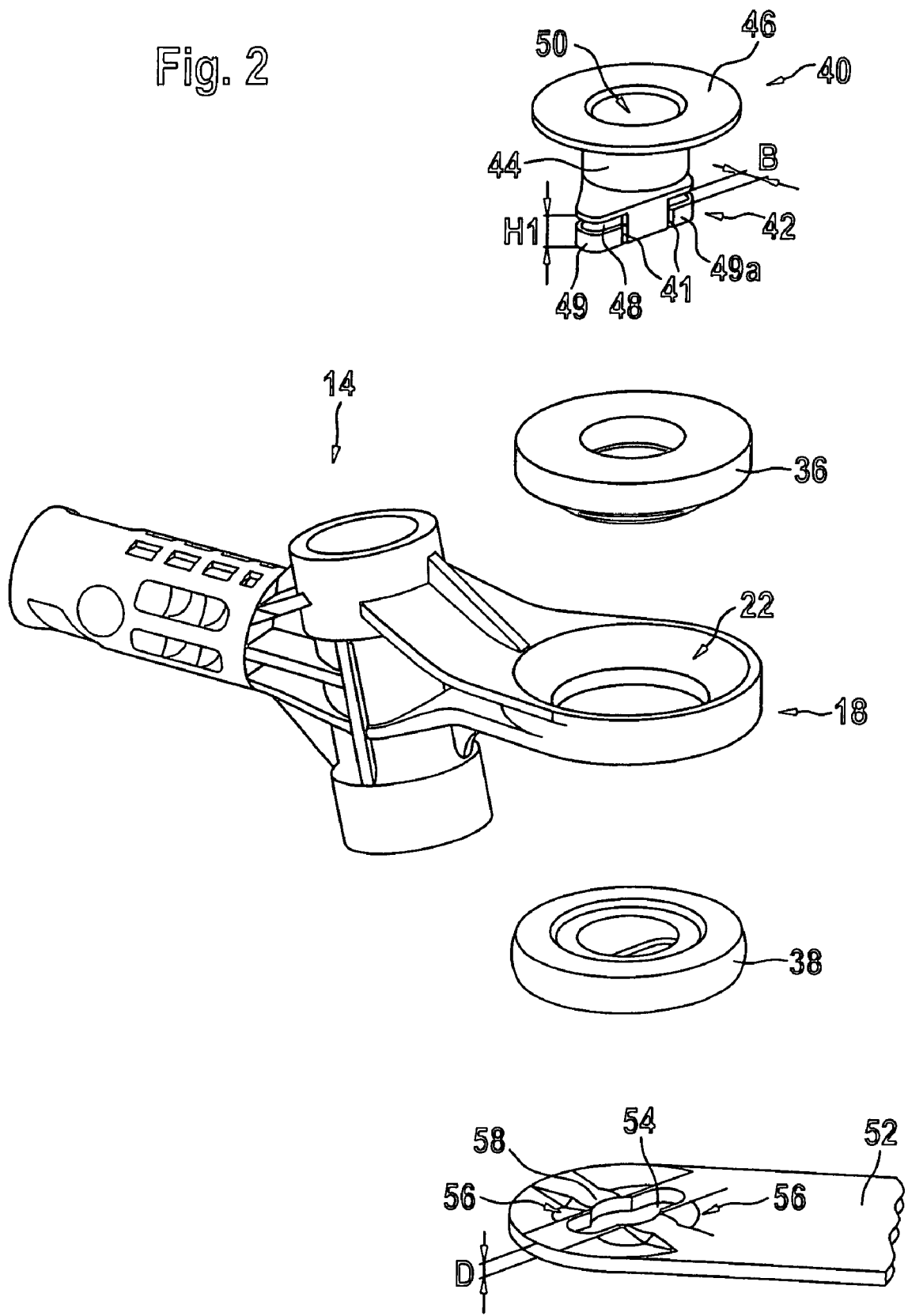

FIG. 2 shows an exploded representation of a wiper bearing of a windshield wiper device in accordance with the invention. As a part of the carrier 12, the wiper bearing 14 has an ear 18 with an opening 22. The damping bushing 36, 38, which is designed as two parts in this case, is inserted into the opening 22. Of course, it is also conceivable to design the bushing 36, 38 as one piece. The damping bushings 36, 38 are embodied as rubber disks, which can also sit with positive engagement in the opening 22 of the carrier 12. A locking element 40, which essentially has three sections, is inserted into the opening 22 with the damping bushings 36, 38. There is a first elliptical section 42 to which a second circular cylindrical section 44 is adjacent. Adjacent to this section, in turn, is a third circular discoid section 46. The first discoid section 42 that is elliptical in cross section has a height of H1 and possesses a transverse groove 48 with width B.

In addition, an engagement 50 is arranged in the third section 46, which engagement is embodied for example as a polygon or as a slot, into which a tool can be inserted to easily rotate the locking element 40 during assembly.

The locking element 40 itself is inserted during assembly into a first part 52 and rotated relative to it by an angle of less than 360 degrees. In this case, the first part 52 is embodied as a sheet metal part, in particular a stamped bent part, has thickness D and is connected to the vehicle body. It also has a hole 54, which has the same contour as the first section 42 of the locking element 40 so that said locking element can penetrate the first part 52. Ideally, the first part 52 is embodied as one piece with the vehicle body.

The transverse groove 48, whose width B is typically greater than the thickness D of part 52, allows two brackets 49, 49a to be created, which project over the cross-sectional profile of the second section. In this case, the brackets 49, 49a feature predetermined breaking points 41, which have a reduced resistance cross section. Alternatively, only one of the brackets 49, 49a can have a predetermined breaking point 41. Naturally, instead of transverse groove 48 a simple step can be provided so that the brackets 49, 49a can also project beyond the contour of the second section.

As a further alternative, the predetermined breaking point 41 can also be arranged in the second section 44. In this case, said second section can have one at least partially circumferential groove, which reduces the resistance cross section of the second section 44.

Appropriately, the ends of the wiper shafts 26, 28, which are connected to the wiper arms, are arranged on the side of the wiper bearing 14 facing the first part 52 so that the ears 18 are pressed away from the first part 52 when the wiper shaft 26, 28 is under stress.

During assembly, the first section 42 with the brackets 49, 49a of the locking element 40 penetrates the first part 52 through the hole 54. By turning the locking element 40, the carrier 12 of the windshield wiper device 10 is connected to the first part 52 as a part of the vehicle body. The part 52 has elevations or die-cuts of such a type in the area of the hole 54 that a radial, thread-like slant 56 is created, along which the brackets 49, 49a slide when the locking element 40 is rotated, so that the distance of the third section 46 of the locking element 40 and the first part 52 is reduced and the locking element 40 is pulled as it were into the part 52. Provided on the high end of the slant 56, is a catch 58, embodied as a small depression, into which at least one bracket 49 slides. This prevents the bracket 49 from sliding down the slant 56 when the locking element 40 is situated in the closed position. Thus, a bayonet catch with high strength is produced.

Figure 3:
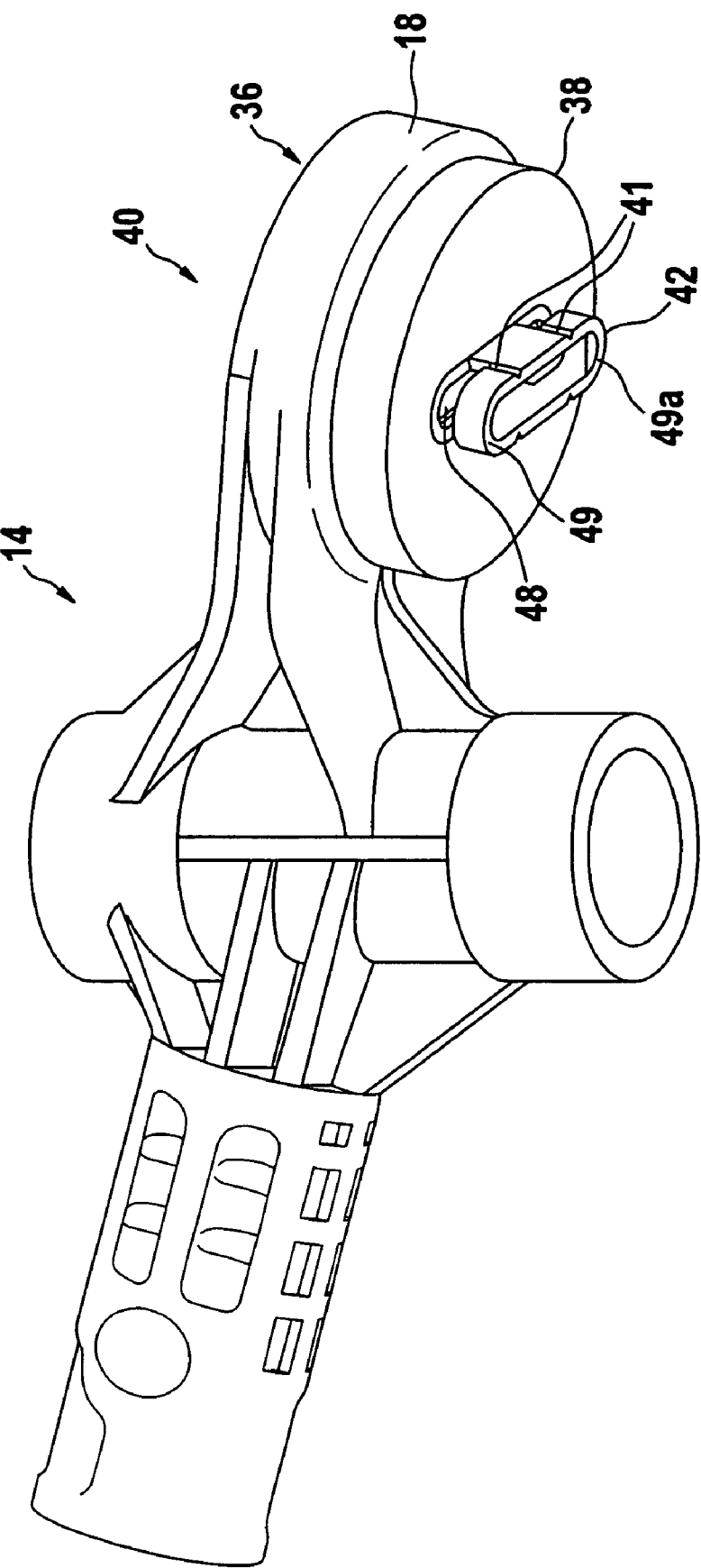

FIG. 3 shows the fixing area of a carrier in the delivery state at the motor vehicle manufacturer. The locking element 40 is pulled through the opening 22 of the ear 18 of the wiper bearing 14 and is enclosed by the damping elements 36, 38. The first section 42 with the brackets 49, 49a and the transverse groove 48 projects out of the damping element 38.

Figure 4:
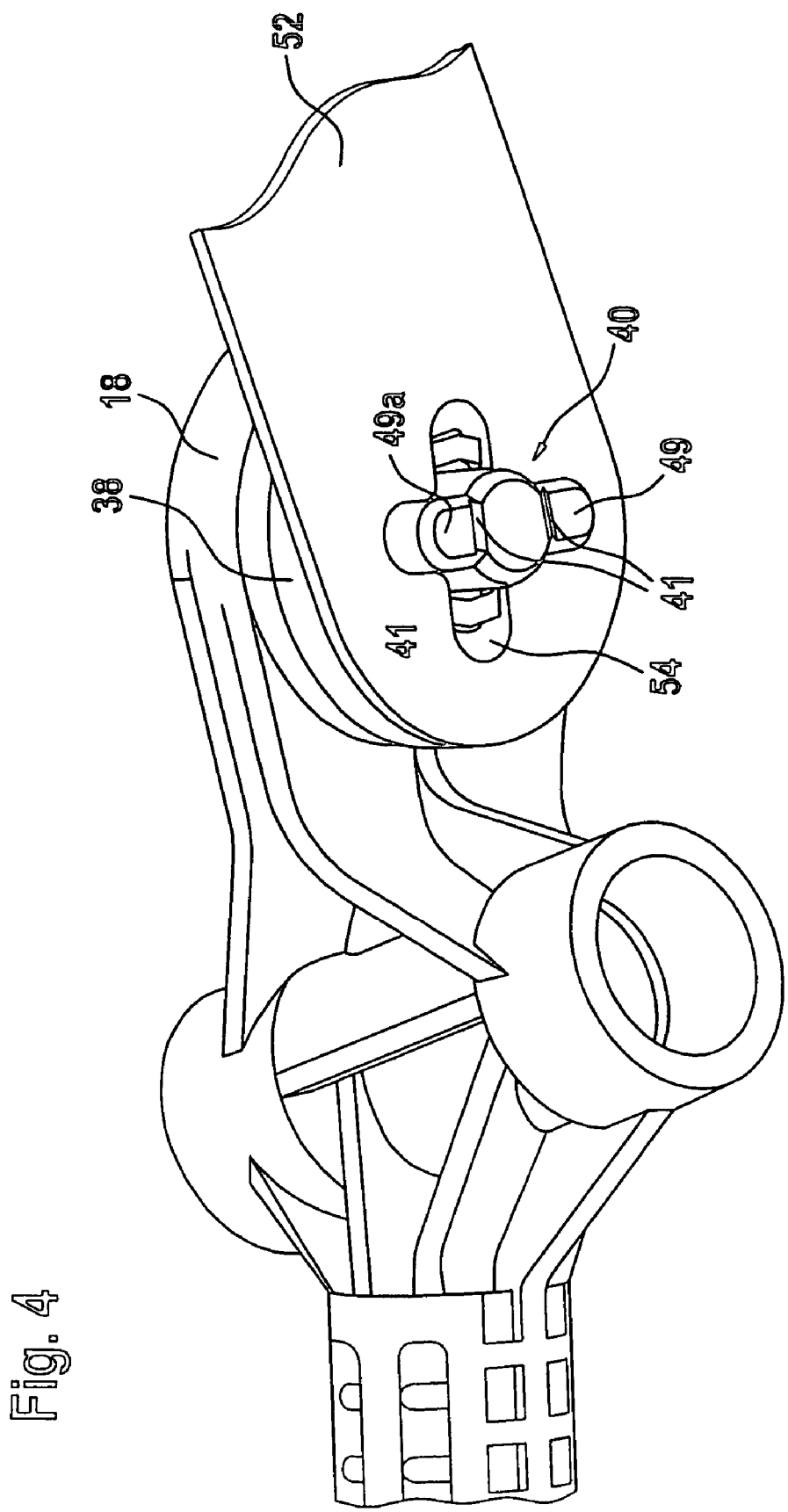

FIG. 4 depicts the fixing area of the carrier 12 in an assembled representation. The locking element 40 has penetrated the damping elements 36, 38 as well as the opening 22 and the first part 52 through the hole 54 and was rotated by approx. 90° to its longitudinal axis. In this way, the brackets 49, 49a form holders on the part 52 in such a way that the carrier of the windshield wiper device 10 is clamped between the third section 46 of the locking element 40 and the brackets 49, 49a of the first section of the locking element.

FIG. 5 shows a variation of the windshield wiper device in accordance with the invention. The locking element 40 is again comprised of three sections. The first section 42 corresponds to a double keyhole contour and thereby forms two brackets 49, 49a, which project over the cylindrical contour of the second section 44. The second section 44 is directly adjacent to the first section 42 and together with it forms a step on the brackets 49, 49a. Adjacent, in turn, to this second section 44 is the third section 46, which features the engagement 50 to accommodate a tool.

Naturally, the third section 46 can also be embodied, for example in its outer contour, as a polygon and thereby itself serve as an engagement. The damping bushings 36, 38 are embodied here as one piece and can be inserted as a whole into the opening 22 of the wiper bearing 14 of the carrier 12. The hole 54 of the first part 52, in turn, has the contour of the double keyhole so that the hole is able to accommodate the first section 42 of the locking element 40.

The locking element 40 is embodied as a plastic injection molded part, however, it can also be embodied of a metal, e.g., aluminum, an aluminum alloy or a zinc alloy. The damping bushings 36 are made of rubber or another elastic material, which has good damping behavior. The part 52 is permanently welded onto the vehicle body as a simple extension or embodied as one piece with said vehicle body. The wiper bearings 14, 16 of the carrier 12 can be embodied of plastic, but also of metal. In principle, the entire carrier 12 can also be injection molded from plastic as one piece.

The invention claimed is:

1. Windshield wiper device, for a motor vehicle, comprising a carrier (12) for fixing to a first part (52), and a locking element (40), which enables the carrier (12) to be fixed to the first part (52) by means of a rotational connection, characterized in that the locking element (40) has a predetermined breaking point (41), characterized in that the locking element (40) features a first section (42), which is longer in cross section than it is wide, and the predetermined breaking point (41) is arranged in the first section (42), and characterized in that the first section (42) has a transverse groove (48) to accommodate the first part (52).

2. Windshield wiper device according to claim 1, characterized in that the rotational connection has a catch (58) to lock the locking element (40) so that a rotational/locking connection is formed.

3. Windshield wiper device according to claim 2, characterized in that the carrier (12) has an opening (22) and that the locking element (40) in a closed state penetrates the opening (22).

4. Windshield wiper device according to claim 3, characterized in that a minimum of one, at least partially elastic damping bushing (36, 38) is arranged between the locking element (40) and opening (22).

5. Windshield wiper device according to claim 4, characterized in that first section (42) is elliptical in cross section.

6. Windshield wiper device according to claim 5, characterized in that the width (B) of the transverse groove (48) is greater than the thickness D of the first part (52).

7. Windshield wiper device according to claim 6, characterized in that the first part (52) is embodied as a stamped part or stamped bent part and features a hole (54) having the shape of the first section (42) of the locking element (40).

8. Windshield wiper device according to claim 7, characterized in that the locking element (40) penetrates the first part (52) and the first part (52) features a slant (56) of such a type that the locking element (40) is pulled into the first part (52) during the closing process.

9. Windshield wiper device according to claim 8, characterized in that the locking element (40) has an engagement (50), which enables it to cooperate with a tool.

10. Windshield wiper device according to claim 1, characterized in that the carrier (12) has an opening (22) and that the locking element (40) in a closed state penetrates the opening (22).

11. Windshield wiper device according to claim 10, characterized in that a minimum of one, at least partially elastic damping bushing (36, 38) is arranged between the locking element (40) and opening (22).

12. Windshield wiper device according to claim 1, characterized in that first section (42) is elliptical in cross section.

13. Windshield wiper device according to claim 1, characterized in that the width (B) of the transverse groove (48) is greater than the thickness D of the first part (52).

14. Windshield wiper device according to claim 1, characterized in that the first part (52) is embodied as a stamped part or stamped bent part and features a hole (54) having the shape of the first section (42) of the locking element (40).

15. Windshield wiper device according to claim 1, characterized in that the locking element (40) penetrates the first part (52) and the first part (52) features a slant (56) of such a type that the locking element (40) is pulled into the first part (52) during the closing process.

16. Windshield wiper device according to claim 1, characterized in that the locking element (40) has an engagement (50), which enables it to cooperate with a tool.

17. Windshield wiper device according to claim 1 wherein the first part is connected to a body of the motor vehicle.

* * * * *